(12) United States Patent
Wu et al.

(10) Patent No.: US 10,914,915 B2
(45) Date of Patent: Feb. 9, 2021

(54) PROJECTION LENS

(71) Applicant: Coretronic Corporation, Hsin-Chu (TW)

(72) Inventors: Chao-Kuan Wu, Hsin-Chu (TW); Chen-Yi Hong, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 129 days.

(21) Appl. No.: 16/049,819

(22) Filed: Jul. 31, 2018

(65) Prior Publication Data
US 2020/0041755 A1 Feb. 6, 2020

(51) Int. Cl.
*G02B 7/09* (2006.01)
*G02B 13/16* (2006.01)

(52) U.S. Cl.
CPC .............. *G02B 7/09* (2013.01); *G02B 13/16* (2013.01)

(58) Field of Classification Search
CPC .................................. G02B 7/09; G02B 13/16
USPC ................. 359/642, 811, 819, 822, 823, 825
See application file for complete search history.

(56) References Cited

U.S. PATENT DOCUMENTS

| | | | |
|---|---|---|---|
| 6,456,796 B1 * | 9/2002 | Tanaka | G02B 7/10 396/131 |
| 10,495,155 B2 * | 12/2019 | Kobayashi | F16D 43/216 |
| 2014/0063296 A1 * | 3/2014 | Ohya | H04N 5/23296 348/240.3 |
| 2017/0293210 A1 * | 10/2017 | Shimizu | G03B 21/142 |

FOREIGN PATENT DOCUMENTS

| | | |
|---|---|---|
| CN | 204389854 | 6/2015 |
| CN | 105974551 | 9/2016 |

* cited by examiner

*Primary Examiner* — Tuyen Tra
(74) *Attorney, Agent, or Firm* — Jcipmet

(57) ABSTRACT

A projection lens includes a lens barrel, at least one lens, a focus adjusting ring, a focus adjusting gear, and a driving module. The at least one lens is disposed in the lens barrel. The focus adjusting ring is disposed on the lens barrel. The focus adjusting gear is fixed on the focus adjusting ring. The driving module is connected with the focus adjusting gear. The driving module includes a motor, a motor gear, a limiter, and an elastic element. The motor has a rotating shaft. The motor gear is penetrated through by the rotating shaft and engages with the focus adjusting gear. The limiter is fixed on the rotating shaft. The elastic element is disposed between the limiter and the motor gear, wherein the limiter applies a normal force to the motor gear through the elastic element.

12 Claims, 4 Drawing Sheets

PROJECTION LENS

BACKGROUND OF THE INVENTION

1. Field of the Invention

The invention generally relates to an optical device and, in particular, to a projection lens.

2. Description of Related Art

A projector is capable of projecting a large image much larger than its image source, so that the projector plays an irreplaceable role in the display region. A projection lens is a key optical component in the projector, and can project an image from an image source onto a screen. Since the distance between the projector and the screen is changed in different occasions, a focus adjusting ring is used to be rotated so as to shift the focus point of the projection lens. As a result, a clear image may be formed on the screen in the different occasions.

An auto-focusing projection lens may perform focusing automatically by using a motor to drive the focus adjusting ring to move the distance between at least two lenses of the projection lens. However, the focus adjusting ring has two dead point orientations, and is rotated between the two dead point orientations. When the focus adjusting ring is rotated to each of the dead point orientations, the focus adjusting ring is forced to rest, which is easy to damage the motor if the motor keeps driving the focus adjusting ring. An optical detector may be used to determine whether the focus adjusting ring is rotated to the dead point orientations or not. If the optical detector determines that the focus adjusting ring is rotated to any one of the dead point orientations, a controller may command the motor to stop driving the focus adjusting ring, so that the motor is prevented from being damaged. However, the optical detector and the controller increase the cost of the projection lens.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE INVENTION

Accordingly, the invention is directed to a projection lens, which has a structure to reduce the cost thereof and prevent the motor from being damaged.

An embodiment of the invention provides a projection lens including a lens barrel, at least one lens, a focus adjusting ring, a focus adjusting gear, and a driving module. The driving module includes a motor, a motor gear, a limiter, and an elastic element. The at least one lens is disposed in the lens barrel. The focus adjusting ring is disposed on the lens barrel, and a focus point of the at least one lens is shifted when the focus adjusting ring rotates. The focus adjusting gear is fixed on the focus adjusting ring. The driving module is connected with the focus adjusting gear. The motor has a rotating shaft. The motor gear is penetrated through by the rotating shaft and engages with the focus adjusting gear. The limiter is fixed on the rotating shaft. The elastic element is disposed between the limiter and the motor gear, wherein the limiter applies a normal force to the motor gear through the elastic element.

In the projection lens according to the embodiment of the invention, a simple structure that the limiter applies the normal force to the motor gear through the elastic element is adopted. As a result, the first force of the focus adjusting gear applied to the motor gear is greater than the second force of the motor gear applied to the focus adjusting gear converted from a maximum static friction due to the normal force so that the rotating shaft is rotated with respect to the motor gear when the focus adjusting ring is rotated to and rests at a rotation limit position. Therefore, the rotating shaft will not be forced to stop rotating when the focus adjusting ring is rotated to and rests at a rotation limit position, and the motor is thus prevented from being damaged. Besides, the simple structure effectively reduces the cost of the projection lens.

Other objectives, features and advantages of the invention may be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
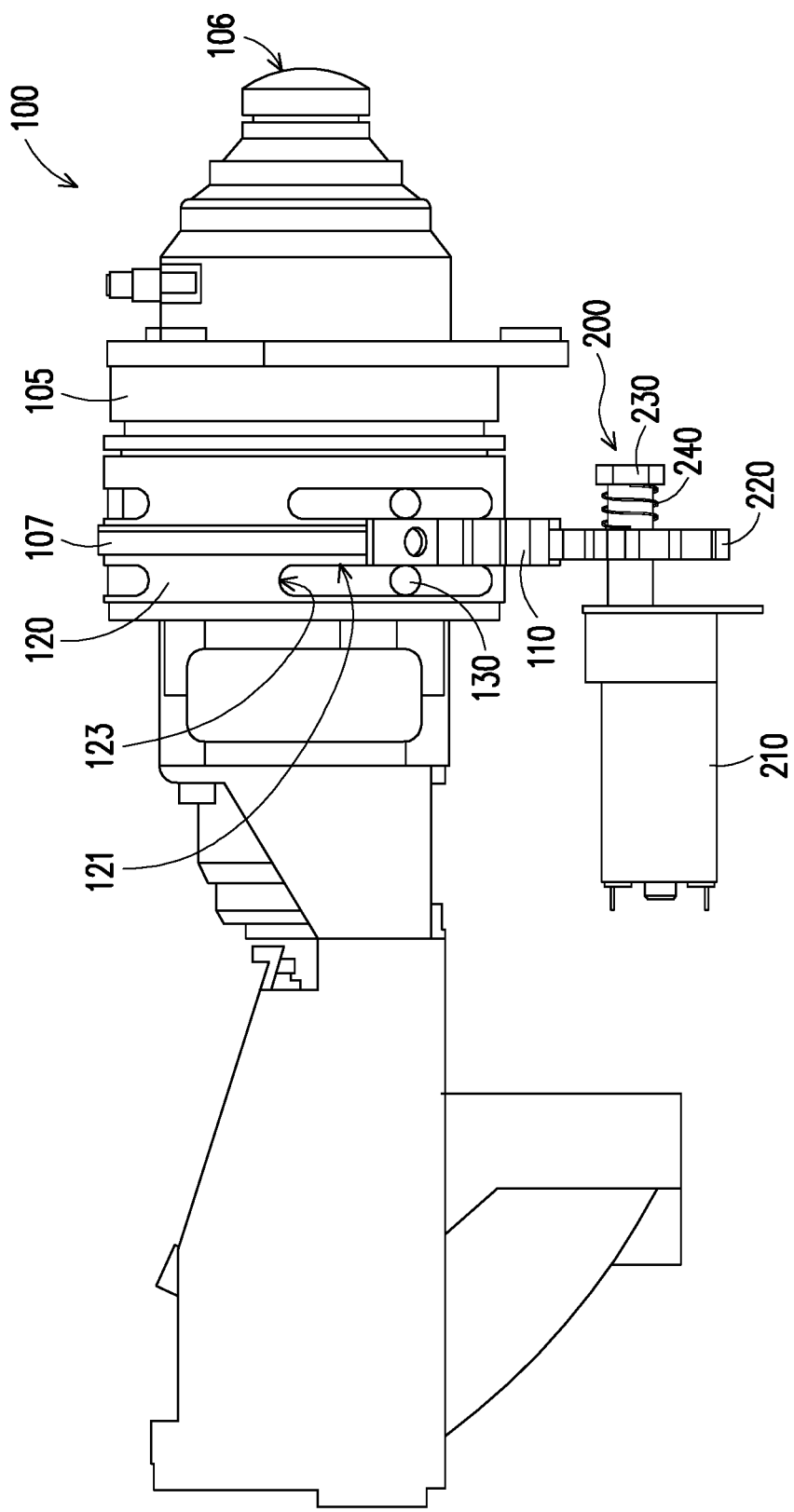
FIG. 1 is a schematic side view of a projection lens according to an embodiment of the invention.
Figure 2A:
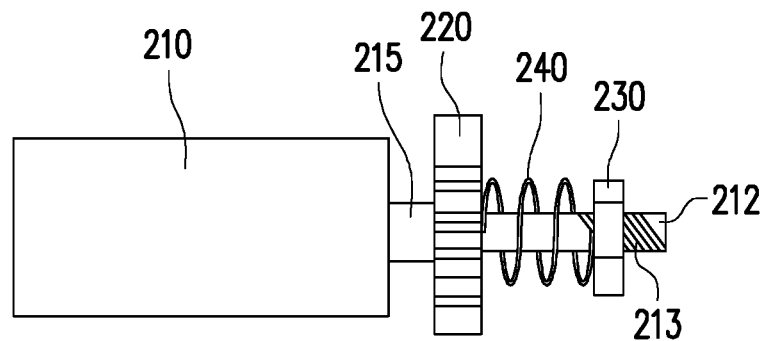
FIG. 2A is a schematic side view showing a driving module of the projection lens according to the embodiment of the invention in FIG. 1.
Figure 2B:
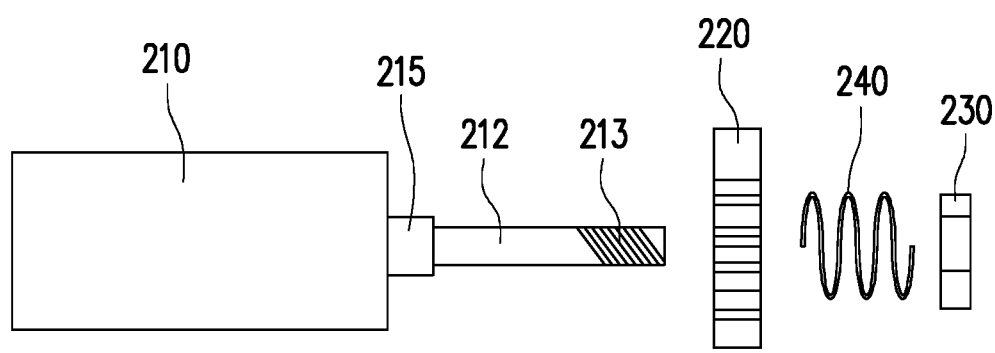
FIG. 2B is a schematic exploded view showing the driving module of the projection lens according to the embodiment of the invention in FIG. 2A.

FIG. 1 is a schematic side view of a projection lens according to an embodiment of the invention. FIG. 2A is a schematic side view showing a driving module of the projection lens according to the embodiment of the invention in FIG. 1. FIG. 2B is a schematic exploded view showing the driving module of the projection lens according to the embodiment of the invention in FIG. 2A. Referring to FIG. 1, FIG. 2A, and FIG. 2B, a projection lens 100 in this embodiment includes a lens barrel 105, at least one lens 106, a focus adjusting ring 107, a focus adjusting gear 110, and a driving module 200. The driving module 200 is connected with the focus adjusting gear 110. The driving module 200 includes a motor 210, a motor gear 220, a limiter 230, and an elastic element 240. The at least one lens 106 is disposed in the lens barrel 105. Generally, a plurality of lenses 106 is disposed in the lens barrel 105. The focus adjusting ring 107 is disposed on the lens barrel 105, and a focus point of the at least one lens 106 (e.g. a plurality of lenses 106) is shifted when the focus adjusting ring 107 rotates.

The focus adjusting gear 110 is fixed on the focus adjusting ring 107. For example, the focus adjusting gear 110 is fixed on the focus adjusting ring 107 by at least one screw. The motor 210 has a rotating shaft 212. The motor gear 220 is penetrated through by the rotating shaft 212. The motor gear 220 engages with the focus adjusting gear 110. The limiter 230 is fixed on the rotating shaft 212. In this embodiment, the rotating shaft 212 has a thread 213, the limiter 230 may be a nut, and the limiter 230 is screwed on the rotating shaft 212 so as to be fixed on the rotating shaft 212. However, in other embodiments, the limiter 230 may be fixed on the rotating shaft 212 by locking, gluing, or any other suitable fixing method.

The elastic element 240 of the driving module 200 is disposed between the limiter 230 and the motor gear 220, wherein the limiter 230 applies a normal force N to the motor gear 220 through the elastic element 240. In this embodiment, the elastic element 240 is a compression spring. However, in other embodiments, the elastic element 240 may be a spring leaf, any other suitable type of spring, an elastomer, or any other suitable elastic element. A first force of the focus adjusting gear 110 applied to the motor gear 220 is less than a second force of the motor gear 220 applied to the focus adjusting gear 110 converted from a maximum static friction due to the normal force N so that the motor 210 rotates the rotating shaft 212 to drive the motor gear 220, the focus adjusting gear 110, and the focus adjusting ring 107 to rotate when an auto-focusing function of the projection lens 100 is implemented. In this embodiment, the motor 210 further has a bearing 215, and the motor gear 220 is disposed between the limiter 230 and the bearing 215. In addition, in this embodiment, the second force originates from the maximum static friction between the elastic element 240 and the motor gear 220 and between the bearing 215 and the motor gear 220.

The first force is greater than the second force so that the rotating shaft 212 is rotated with respect to the motor gear 220 when the focus adjusting ring 110 is rotated to and rests at a rotation limit position, i.e. at a dead point. In this embodiment, the projection lens 100 further includes a limit ring 120 and a protrusion 130. The limit ring 120 has a groove 121. The protrusion 130 penetrates through the groove 121 and is capable of moving along the groove 121. One of the limit ring 120 and the protrusion 130 is fixed to the focus adjusting ring 110, and the other one of the limit ring 120 and the protrusion 130 is fixed to the lens barrel 105. For example, the protrusion 130 is fixed on the lens barrel 105 and the limit ring 120 is fixed on the focus adjusting ring 110. The protrusion 130 moves to and rests at an end 123 of the groove 121 when the focus adjusting ring 110 is rotated to and rests at a rotation limit position.

In the projection lens 100 according to this embodiment, a simple structure that the limiter 230 applies the normal force N to the motor gear 220 through the elastic element 240 is adopted. As a result, the first force of the focus adjusting gear 110 applied to the motor gear 220 is greater than the second force of the motor gear 220 applied to the focus adjusting gear 110 converted from a maximum static friction due to the normal force N so that the rotating shaft 212 is rotated with respect to the motor gear 220 when the focus adjusting ring 107 is rotated to and rests at a rotation limit position. Therefore, the rotating shaft 212 may not be forced to stop rotating when the focus adjusting ring 107 is rotated to and rests at a rotation limit position, and the motor 210 is thus prevented from being damaged. Besides, the simple structure effectively reduces the cost of the projection lens 100.

Figure 3:
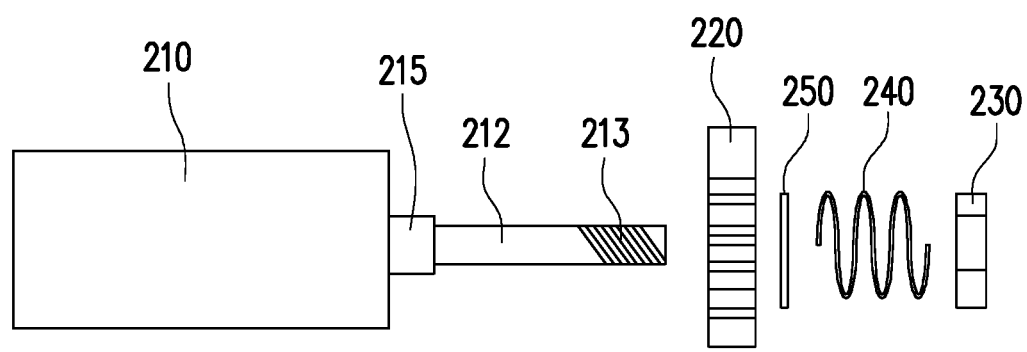
FIG. 3 is a schematic exploded view showing a driving module of the projection lens according to another embodiment of the invention.

FIG. 3 is a schematic exploded view showing a driving module of the projection lens according to another embodiment of the invention. Referring to FIG. 3, the driving module of the projection lens in this embodiment is similar to the driving module of the projection lens 100 in FIG. 1 and FIG. 2A, and the main different therebetween is as follows. In this embodiment, the driving module of the projection lens further includes a gasket 250 disposed between the elastic element 240 and the motor gear 220 and penetrated through by the rotating shaft 212, and the limiter 230 applies a normal force to the motor gear 220 through the elastic element 240 and the gasket 250. Since the gasket 250 is disposed between the elastic element 240 and the motor gear 220, the motor gear 220 is prevented from being worn by the elastic element 240 when the rotating shaft 212 is rotated with respect to the motor gear 220.

Figure 4:
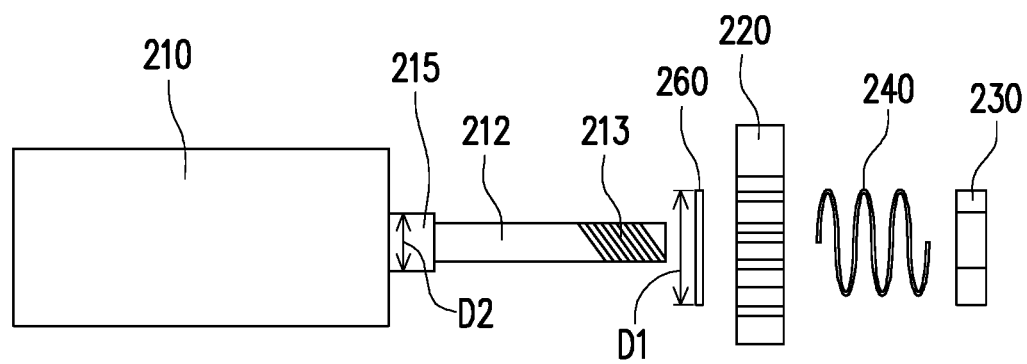
FIG. 4 is a schematic exploded view showing a driving module of the projection lens according to another embodiment of the invention.

FIG. 4 is a schematic exploded view showing a driving module of the projection lens according to another embodiment of the invention. Referring to FIG. 4, a driving module of the projection lens in this embodiment is similar to the driving module of the projection lens 100 in FIG. 1 and FIG. 2A, and the main different therebetween is as follows. In this embodiment, the driving module of the projection lens further includes a gasket 260 disposed between the bearing 215 and the motor gear 220. In this embodiment, the bearing 215 applies a normal force to the motor gear 220 through the gasket 260. Since the gasket 260 is disposed between the bearing 215 and the motor gear 220, the surface of the gasket 260 contacting with the motor gear 220 may be processed to adjust the maximum static friction due to the normal force. Moreover, a diameter D1 of a circumscribed circle of the gasket 260 is greater than a diameter D2 of a circumscribed circle of the bearing 215, which increases the contacting area with the motor gear 220, so that the maximum static friction is easier to be adjusted.

Figure 5:
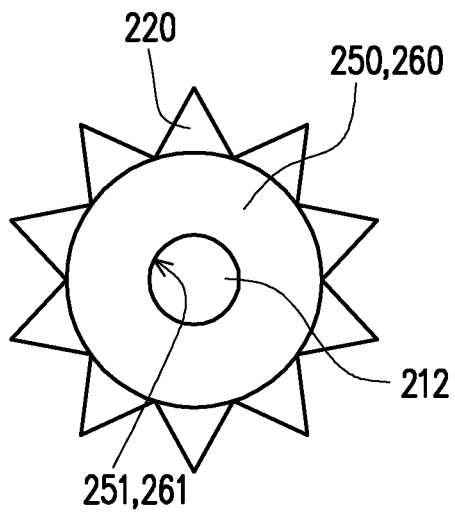
FIG. 5 is a front or back view of the gasket, the motor gear, and the rotating shaft in FIG. 3 or FIG. 4.
Figure 6:
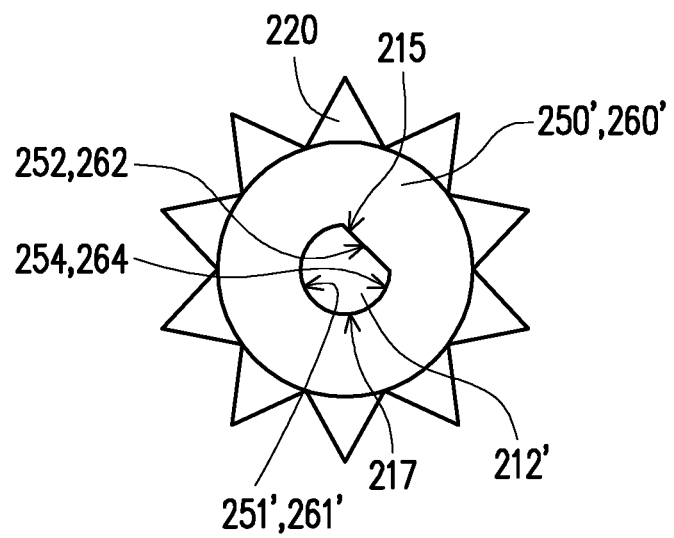
FIG. 6 is a front or back view showing a variation of the gasket and the rotating shaft in FIG. 5.

FIG. 5 is a front or back view of the gasket, the motor gear, and the rotating shaft in FIG. 3 or FIG. 4. FIG. 6 is a front or back view showing a variation of the gasket and the rotating shaft in FIG. 5. Referring to FIG. 5, the gasket 250 or 260 has an opening 251 or 261 penetrated through by the rotating shaft 212, and the opening 251 or 261 has a axisymmetric shape (e.g. a circular shape) corresponding to an axisymmetric cross-section of the rotating shaft 212. However, in other embodiments, a gasket 250' (i.e. a variation of the gasket 250) or a gasket 260' (i.e. a variation of the gasket 260) has an opening 251' or 261' penetrated through by the rotating shaft 212', and the opening 251' or 261' has a non-axisymmetric shape corresponding to a non-axisymmetric cross-section of the rotating shaft 212'. As a result, when the rotating shaft 212' is rotated, the gasket 250' or 260' is always rotated with the rotation of the rotating shaft 212'.

In this embodiment, the opening 251' or 261' has a first straight edge 252 or 262 and a first curved edge 254 or 264, the non-axisymmetric cross-section of the rotating shaft 212' has a second straight edge 215 and a second first curved edge 217. The first straight edge 252 or 262 corresponds to the second straight edge 215, and the first curved edge 254 or 264 corresponds to the second curved edge 217. However, in this embodiment, the central hole of the motor gear 220 may be axisymmetric (e.g. circular) and has a shape different from the opening 251' or 261', so that the shaft 212' is capable of being rotated with respect to the motor gear 220.

In the projection lens according to the embodiment of the invention, a simple structure that the limiter applies the normal force to the motor gear through the elastic element is adopted. As a result, the first force of the focus adjusting gear applied to the motor gear is greater than the second force of the motor gear applied to the focus adjusting gear converted from a maximum static friction due to the normal force so that the rotating shaft is rotated with respect to the motor gear when the focus adjusting ring is rotated to and rests at a rotation limit position. Therefore, the rotating shaft may not be forced to stop rotating when the focus adjusting ring is rotated to and rests at a rotation limit position, and the motor is thus prevented from being damaged. Besides, the simple structure effectively reduces the cost of the projection lens.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection lens comprising:
   a lens barrel;
   at least one lens disposed in the lens barrel;
   a focus adjusting ring disposed on the lens barrel, wherein a focus point of the at least one lens is shifted when the focus adjusting ring rotates;
   a focus adjusting gear fixed on the focus adjusting ring;
   a driving module connected with the focus adjusting gear, the driving module comprising:
      a motor having a rotating shaft;
      a motor gear penetrated through by the rotating shaft and engaging with the focus adjusting gear;
      a limiter fixed on the rotating shaft; and
      an elastic element disposed between the limiter and the motor gear, wherein the limiter applies a normal force to the motor gear through the elastic element, wherein the motor is connected to the rotating shaft and drives the rotating shaft rotating, the motor and the limiter are respectively located at opposite ends of the rotating shaft, and the elastic element is located at a side of the motor gear away from the motor.

2. The projection lens according to claim 1, wherein a first force of the focus adjusting gear applied to the motor gear is less than a second force of the motor gear applied to the focus adjusting gear converted from a maximum static friction due to the normal force so that the rotating shaft drives the motor gear, the focus adjusting gear, and the focus adjusting ring to rotate when an auto-focusing function of the projection lens is implemented, and wherein the first force is greater than the second force so that the rotating shaft is rotated with respect to the motor gear when the focus adjusting ring is rotated to and rests at a rotation limit position.

3. The projection lens according to claim 1 further comprising a gasket disposed between the elastic element and the motor gear and penetrated through by the rotating shaft.

4. The projection lens according to claim 3, wherein the gasket has an opening penetrated through by the rotating shaft, and the opening has a non-axisymmetric shape corresponding to a non-axisymmetric cross-section of the rotating shaft.

5. The projection lens according to claim 4, wherein the opening has a first straight edge and a first curved edge, the non-axisymmetric cross-section of the rotating shaft has a second straight edge and a second first curved edge, the first straight edge corresponds to the second straight edge, and the first curved edge corresponds to the second curved edge.

6. The projection lens according to claim 1, wherein the motor further has a bearing, and the motor gear is disposed between the limiter and the bearing.

7. The projection lens according to claim 6, further comprising a gasket disposed between the bearing and the motor gear.

8. The projection lens according to claim 7, wherein the gasket has an opening penetrated through by the rotating shaft, and the opening has a non-axisymmetric shape corresponding to a non-axisymmetric cross-section of the rotating shaft.

9. The projection lens according to claim 8, wherein the opening has a first straight edge and a first curved edge, the non-axisymmetric cross-section of the rotating shaft has a second straight edge and a second first curved edge, the first straight edge corresponds to the second straight edge, and the first curved edge corresponds to the second curved edge.

10. The projection lens according to claim 1, wherein the limiter is screwed on the rotating shaft so as to be fixed on the rotating shaft.

11. The projection lens according to claim 1 further comprising:
a limit ring having a groove; and
a protrusion penetrating through the groove and capable of moving along the groove, wherein one of the limit ring and the protrusion is fixed to the focus adjusting ring, and the other one of the limit ring and the protrusion is fixed to the lens barrel,
wherein the protrusion moves to and rests at an end of the groove when the focus adjusting ring is rotated to and rests at a rotation limit position.

12. The projection lens according to claim 1, wherein the elastic element is a compression spring.

* * * * *